United States Patent [19]

Shioya et al.

[11] Patent Number: 4,985,847

[45] Date of Patent: Jan. 15, 1991

[54] VISUAL SENSOR SYSTEM

[75] Inventors: Makoto Shioya, Tokyo; Masao Adachi, Sagamihara, both of Japan

[73] Assignee: Hitachi, Ltd., Tokyo, Japan

[21] Appl. No.: 143,482

[22] Filed: Jan. 13, 1988

[30] Foreign Application Priority Data

Jan. 14, 1987 [JP] Japan .................................. 62-4819

[51] Int. Cl.[5] ...................... G06F 15/20; G01N 21/84
[52] U.S. Cl. ............................... 364/516; 364/424.05;
358/103; 250/202
[58] Field of Search ............... 250/560, 561, 562, 563,
250/572, 200, 201, 202; 356/237; 358/106, 107,
108, 103; 364/424.01, 424.05, 516, 556, 560,
561, 562

[56] References Cited

U.S. PATENT DOCUMENTS

| | | | |
|---|---|---|---|
| 4,237,539 | 12/1980 | Piovoso et al. | 250/562 |
| 4,348,652 | 9/1982 | Barnes et al. | 250/561 |
| 4,542,404 | 9/1985 | Duschl | 358/106 |
| 4,634,879 | 1/1987 | Penney | 250/560 |
| 4,659,936 | 4/1987 | Kikkawa et al. | 250/560 |
| 4,673,817 | 6/1987 | Oomen | 250/561 |
| 4,707,600 | 11/1987 | Nakao et al. | 250/561 |
| 4,770,438 | 9/1988 | Sugasawa et al. | 364/424.05 |
| 4,786,815 | 11/1988 | Walker et al. | 250/560 |
| 4,797,557 | 1/1989 | Ohman | 250/561 |

Primary Examiner—Parshotam S. Lall
Assistant Examiner—V. Trans
Attorney, Agent, or Firm—Pennie & Edmonds

[57] ABSTRACT

A visual sensor system includes a moving object movable along a two-dimensional plane, and a one-dimensional array of photosensitive means fixedly mounted on the moving object. The photosensitive means are arranged in such a manner that the array is located within a first plane substantially perpendicular to a central axis of a line of sight and forms, within the second plane, a given angle with a line intersecting a second plane containing the central axis of the line of sight and substantially perpendicular to the two-dimensional plane.

6 Claims, 3 Drawing Sheets

VISUAL SENSOR SYSTEM

BACKGROUND OF THE INVENTION

The present invention relates to a visual sensor system for moving objects such as vehicles and more particularly to a visual sensor system capable of extracting a characteristic feature of an object present on the path with greater ease.

In a conventional rear monitoring system for large busses, for example, a TV camera is used as a visual sensor by mounting it on the vehicle body in such a manner that its horizontal scanning line become substantially parallel to the horizontal surface of a road.

There is another conventional system in which the infrared automatic focus adjusting principle of a TV camera mounted on a vehicle (moving object) as a sensor is utilized to detect the road surface condition. This system is desired so that the sensor system mounted on the vehicle includes a light emitting device, light projecting and receiving optical systems and one-dimensional photosensor array whereby a sport light is projected toward the road surface from the light emitting device through the light projecting optical system and the scattered spot light from the road surface or an obstruction is received by the light receiving optical system, thereby determining the distance between the vehicle and the road surface or obstruction from the relation between the spot position on the one-dimensional photosensor array and the light emitting position in accordance with the principle of the triangulation. Where the inclination of the system relative to the road surface is known, the height of the light scattering point is also determined.

In this connection, as the prior art related to this type of system, the techniques disclosed in JA-A-47-44738 and JP-A48-47040 may for example be cited.

In the case of the first prior art, while an object composed of substantially vertical lines, such as, a tree, person, the vertical line elements of an automobile or the center line on the path appears in the form of a characteristic variation in the horizontal scanning line and is easily recognizable by the horizontal scanning, there is a disadvantage that any object composed of substantially horizontal lines, such as, the joint of the road pavement or the horizontal line elements of an automobile does not appear as a characteristic variation in the horizontal scanning line and is not easily recognizable by the horizontal scanning.

Where a two-dimensional planar received information is obtainable as in the case of a TV camera, while any horizontal lines can also be recognized by arranging the TV camera to scan even in the vertical direction, this gives rises to another disadvantage that to scan in both the horizontal and vertical directions requires an excessive amount of time. On the other hand, where the one-dimensional array of photosensors, e.g., one-dimensional array of charge-coupled devices (CCDs) is used in place of a TV camera employing two-dimensional array elements, depending on whether the one-dimensional array direction is selected to be the horizontal or vertical direction, it is possible to satisfactorily recognize the point of a feature of either one of an object composed of vertical lines and another composed of horizontal liens but the recognition of the point of a feature of the other is not satisfactory.

Also, int he case of the abovedescribed second prior art or the system for detecting the surface condition of a road, there is a disadvantage that since the detection is effected by receiving the scattered light of the projected beam sport from the light emitting device, no consideration is given to such cases where the reflected light of the beam is made weak and where the disturbance light is excessively strong with the resulting deterioration of the performance. It is to be noted that the reflected light is weakened in the case of a wetted road surface on a rainy day, snowy road surface, smooth road surface or distant road surface.

Also, even in the case of this system, while it is easy to recognize an object composed of substantially vertical lines on the road, there is the disadvantage of difficulty to recognize an object composed of substantially horizontal lines on the road.

SUMMARY OF THE INVENTION

The present invention has been made in view of the foregoing circumstances, and it is an object of the invention to provide a visual sensor system which overcomes the foregoing deficiencies of the conventional visual sensor systems and which is firstly capable of easily recognizing objects on the path, particularly those which are composed of substantially vertical liens and others which are composed of substantially horizontal liens and also requiring no great time.

It is another object of the invention to provide a visual sensor system which is well suited for use as a road surface condition detecting system capable of detecting the surface condition of a road without being greatly subjected to the effect of any disturbance light.

To accomplish the first object, in accordance with a first aspect of the invention there is provided a visual sensor system for a moving object movable along a two-dimensional plane, in which a one-dimensional array of photosensitive means forming a sensor is mounted on the moving object in a manner that the array is located within a plane substantially perpendicular to the central axis of the line of sight and has a tilt angle with respect to a vertical plane containing the central axis of the line of sight within the first-mentioned plane.

To accomplish the second object, in accordance with a second aspect of the invention there is provided such visual sensor system including means for detecting quantities which can be calculated in terms of a height of gravitational center and tilt angle about gravitational center of the moving object, means for extracting a feature of a received information of the photosensitive means forming the visual sensor, and means for computing a distance to the point of the feature on the plane of movement in accordance with the information detected by the detecting means and the feature extracted by the feature extracting means.

The visual sensor system according to the first aspect performs the following operations in view of the fact that a large part of artificial objects (automobiles, roads, buildings, signs, telegraph poles, etc.) and natural objects (plants, persons, etc.) subjected to the action of the gravity on the path of a moving object are made up of line elements or surface elements substantially parallel (horizontal) or perpendicular (vertical) to the plane of movement (e.g., the road) of the moving object and that in a plane in which the visual sensor is present and which is substantially perpendicular to the line of sight the image of any of such objects is horizontal or parallel to a line intersecting a plane which contains the plane containing the visual sensor and substantially perpendicular to the line of sight and which is perpendicular to the plane of movement.

The one-dimensional array of photosensitive means forming the visual sensor forms and angle of about 30 to 60 degrees with the intersecting line on the plane containing the visual sensor and substantially perpendicular to the line of sight. Thus, the previously mentioned image composed of substantially horizontal or vertical line elements or surface elements forms and angle of about 30 to 60 degrees with the one-dimensional array of photosensitive means forming the visual sensor and it is reflected as a characteristic variation on the one-dimensional array of photosensitive means forming the visual sensor.

As a result, any object on the path is recognized without fail.

On the other hand, the visual sensor system according to the second aspect employs no projected beam but it is designed to receive the reflected light from a wide extent of the road surface or obstruction illuminated by the natural light during the daytime and by the lamplight beams having a spread, e.g., the headlight beams during the night. Therefore, there is less possibility of decreasing the intensity of a reflected light to be received and also the disturbing light acts in a direction tending to increase the quantity of light to be received and make it easier to grasp a feature in the field of vision.

Moreover, while the road surface, the optical axis of the receiving optical system and the height of the photosensitive elements from the road surface are used as the reference lines in the principle of the triangulation due to the use of no projected light beam, even if the inclination of the optical axis of the receiving optical system with respect to the road surface is varied by the movement of the moving object, the means for detecting it is provided so that the triangulation can be effected accurately after the provision of the necessary compensation.

DESCRIPTION OF THE PREFERRED EMBODIMENTS

Figure 1:
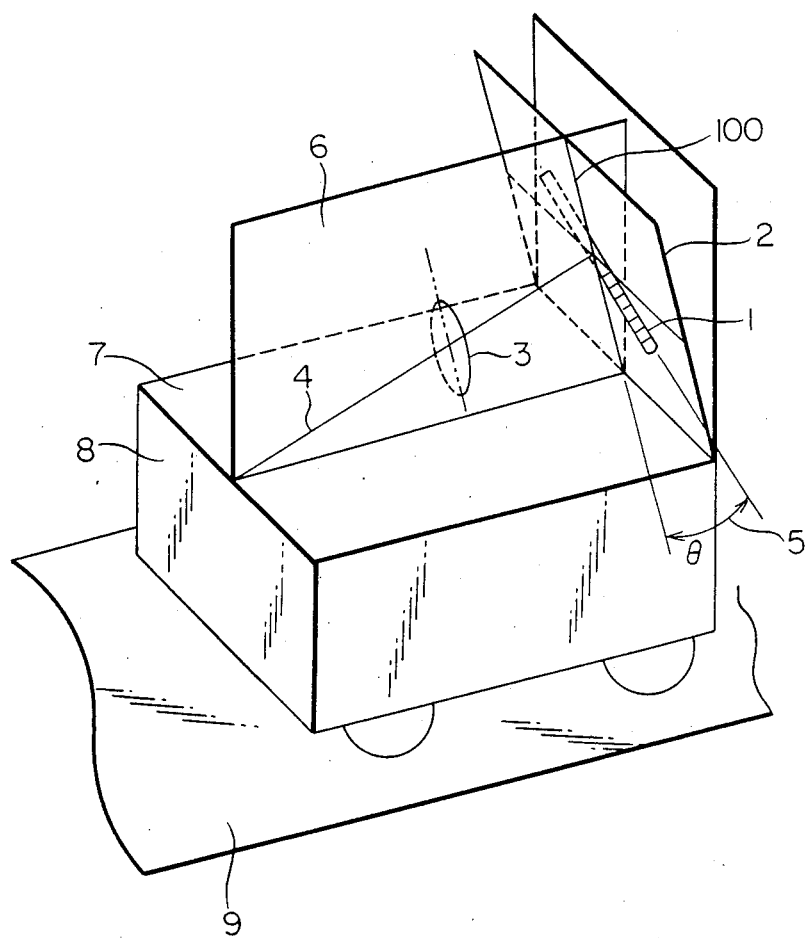
FIG. 1 is a perspective view showing the manner in which a visual sensor system according to an embodiment of the invention is arranged.

FIG. 1 is a perspective view showing the manner in which a visual sensor system according to an embodiment of the invention is arranged. In the Figure, numeral 1 designates a one-dimensional photosensitive array arranged on a photosensitive surface 2 substantially perpendicular to a line of sight 4, 3 a lens, 4 the line of sight, and 5 an angle $\theta$ formed by the one-dimensional photosensitive array on the photosensitive surface 2 and a line 100 intersecting a plane 6 containing the photosensitive surface 2 and the central axis of the line of sight 4 and substantially perpendicular to the below-mentioned reference surface 7, that is, a characteristic tilt angle according to the invention. It is to be noted that the reference surface 7 of a moving object 8 movable along a plane of movement 9 shows a surface which is substantially parallel (horizontal) to the plane of movement 9.

With the embodiment constructed as described above, when the moving object 8 moves along the plane of movement 9, the light from an object in the direction of the line of sight 4 substantially perpendicular to the photosensitive plane 2 is received through the lens 3 by the one-dimensional photosensitive array 1 arranged on the photosensitive plane 2 to form a visual sensor. In this case, as mentioned previously, the one-dimensional photosensitive array 1 forming the visual sensor has the tilt angle 5 which is a characteristic feature of the invention so that the image of an object near onto the plane of movement 9 in the direction of the line of sight 4, the image being composed of horizontal or vertical elements, traverses the one-dimensional photosensitive array 1 forming the visual sensor at an angle in the range from about 60 to 30 degrees and thus it can be grasped accurately.

In accordance with this embodiment, a large part of the line elements composing the object on the path intersects the one-dimensional photosensitive array 1 forming the visual sensor at an angle in the range from about 60 to 30 degrees and the object on the path is recognized without fail. In particular, where the point of the intersection is considered to correspond to a feature point (e.g., the edge) of the object and the visual sensor is utilized for the purpose of detecting the presence of the object, the distance to the object or the size of the object, there is no danger of failing to effect the detection with the resulting effect of decreasing the occurrence of erroneous recognition.

Figure 2:
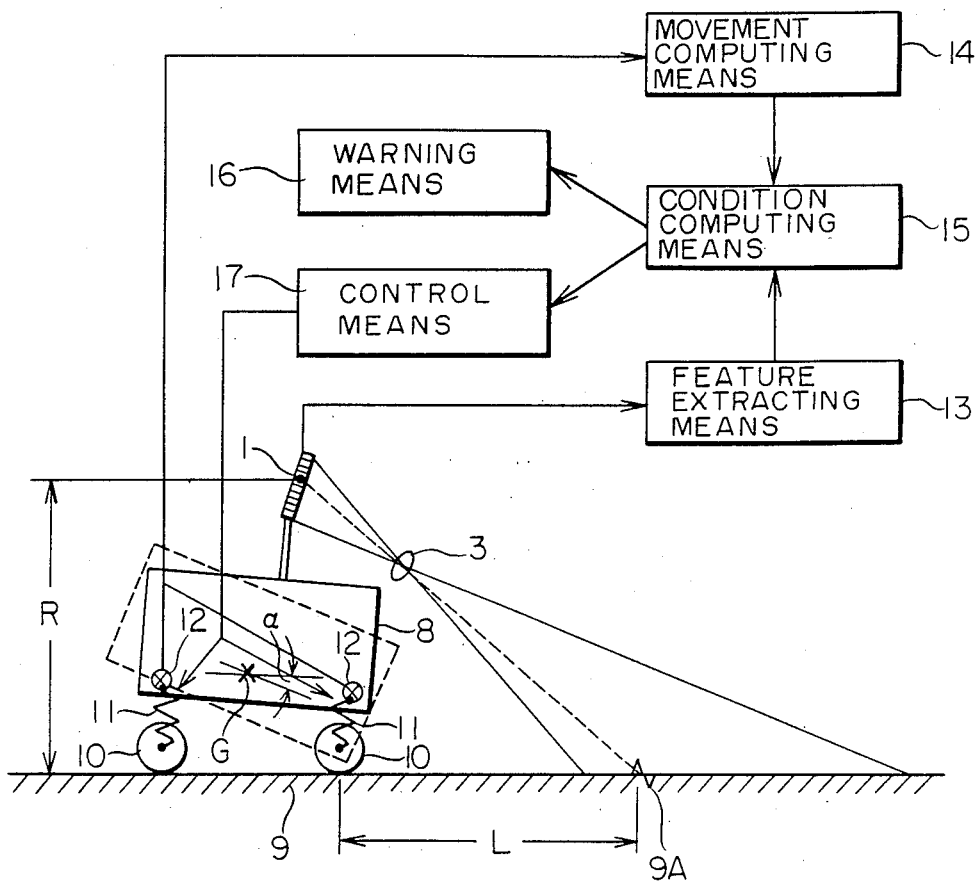
FIG. 2 is a schematic diagram showing the construction of a vehicle suspension control system according to another embodiment of the invention.
Figure 3:
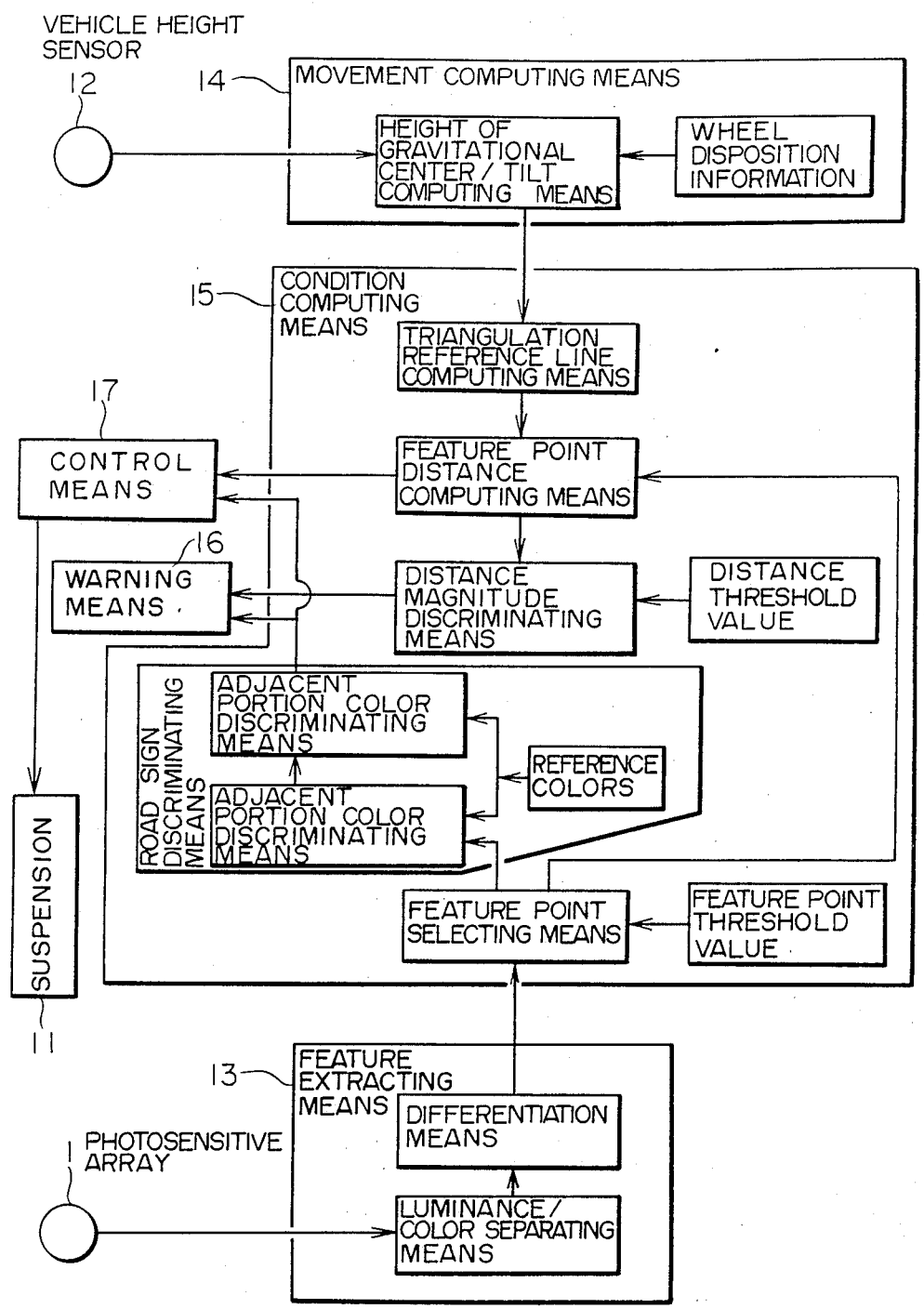
FIG. 3 is a block diagram showing the block circuits of FIG. 2 in greater detail.

Referring to FIG. 2, there is illustrated the construction of a system incorporating a visual sensor system according to another embodiment of the invention to detect the surface condition of a road to control the suspension of a moving object (vehicle). In the Figure, numerals 1, 3, 8 and 9 designate the same component elements as their counterparts shown in FIG. 1. Numeral 10 designates the wheels of the moving object 8, 11 the suspension of the moving object 8, 12 vehicle height sensors which are themselves well known, 13 feature extracting means, 14 movement computing means, 15 condition computing means, 16 warning means, and 17 suspension control means. Numeral 9A designates a feature point (e.g., an irregularity) on the plane of movement 9. FIG. 3 shows a reference block diagram.

In accordance with this embodiment, the visual sensor system includes a light receiving optical system including the lens 3 as its main component, the one-dimensional photosensitive array 1 arranged in correspondence to the intersecting line 100 in FIG. 1 and the vehicle height sensors 12 and it is mounted on the vehicle 8. Also, there are provided the feature extracting means 13 for detecting a feature, e.g., a brightness variation from the information received by the one-dimensional photosensitive array 1, the movement computing means 14 for computing the amounts of the bouncing (vertical translational motion) and pitching (longitudinal rotational motion about the right and left axles) of the vehicle 8 in accordance with the information from the vehicle height sensors 12, the condition computing means 15 for computing a distance L from, for example, the front wheel to the feature point 9A on the plane of movement 9 in accordance with the result of the extracting by the feature extracting means 13 and the result of the computation by the movement computing means 14, the warning means 16 for giving the alarm in case of need in accordance with the result of the computation by the condition computing means 15, and the control means 17 for controlling the suspension 11 in accordance with the result of the computation by the condition computing mean 15.

The vehicle 8 is on the plane of movement (road surface) 9 and the irregularity 9A is ahead of the vehicle 8 in the direction of its travel. The one-dimensional photosensitive array 1 monitors the surface condition of the road in front through the light receiving optical system and its output is delivered to the feature extracting means 13. In accordance with the information from the light receiving optical system, the feature extracting means 13 determines its brightness variation or color variation by a differential operation and delivers the state of the brightness variation or the color variation as a feature to the condition computing means 15.

On the other hand, vehicle height information around the wheels 10 are measured by the respective vehicle height sensors 12 and are delivered to the movement computing means 14. In accordance with the front and rear wheel treads and the vehicle height information delivered to it, the movement computing means 14 computes the height of gravitational center and tilt angle about gravitational center of the vehicle 8 and delivers the results to the condition computing means 15.

In accordance with the delivered movement information, the condition computing means 15 determines a reference line R for the triangulation so that in accordance with the feature previously supplied from the feature extracting means 13, a point (feature point) showing the brightness or color variation greater than a given level is selected and the distance L to the feature point (e.g., the distance from the front wheel to the feature point on the road surface) by utilizing the principle of the triangulation. In this embodiment, the reference line R denotes the line segment between the road surface and the photosensitive means of the one-dimensional photosensitive array 1 where the image of the feature point is formed.

Then, when the distance to the feature point is less than a given value, the warning means 16 gives an alarm indicating that the distance is small. Also, in order to distinguish those drawn on the road surface (e.g., traffic signs) and lamplights reflected by the road surface (e.g., stop lamp, direction lamp and the lamp showing the width of vehicles, traffic signal lights and street lights) from the irregularities on the road surface and the obstructions on the road surface, when only one side of the adjoining portions to the sides of a feature point has any one of white, orange, yellow, red, blue and green colors or when the sides are respectively colored with different two of these colors, it is considered that the feature point is due to one drawn on the road surface or any lamplight reflected from the road surface and the content of the alarm is differred from that used otherwise. For instance, where the alarm is given in terms of a sound, the tone or rhythm may be changed to obtain the desired result.

On the other hand, where the feature point can be considered as an irregularity on the road surface or an obstruction on the road surface, the information of the feature point is supplied, along with the distance information, to the control means 17. When it is detected that the feature point is within a given distance, the control means 17 generates a control command to increase the shock absorbing power of the suspension (to have a soft characteristic). After the wheels have passed the feature point, when the vibration velocity of the vehicle decreases, a command signal is generated to reduce the shock absorbing power of the suspension (to have a hard characteristic) if another feature point is not present within the given distance, whereas a control command is generated to increase the shock absorbing power if the feature point continues to exist up to that time. It is to be noted that under conditions where no feature point is present for some time, to increase or decrease the shock absorbing power is made a matter of choice.

In accordance with this embodiment, the presence of any irregularity on the road surface or the presence of any obstruction on the road surface can be detected in advance and the shock absorbing power of the suspension can be increased, thereby improving the riding confortability during the passage of the rough surface portion or the like. In addition, the driver can be alarmed in advance to the presence of any sign drawn on the road surface, thereby contributing to the traffic safety. Also, any lamplights reflected from the road surface on a rainy day can be distinguished from the irregularities on the road surface and thus there is the effect of avoiding any erroneous suspension control operation.

Further, in the road condition detecting system according to the above-mentioned second embodiment for detecting the condition of a road surface to control the suspension of a vehicle, the one-dimensional photosensitive array 1 forming the visual sensor may be arranged to have the characteristic tilt angle 5 of the invention as shown in the first embodiment, thereby further improving the accuracy.

As will be seen from FIG. 3, the movement computing means 14 includes height of gravitational center/tilt computing means for receiving wheel disposition information relating to the arrangement of the sensor and the wheels to compute the height of the gravitational center G and the inclination α of the vehicle. The feature extracting means 13 includes separating means for separating the output of the one-dimensional photosensitive array 1 into a luminance signal and color signals and differentiation means for differentiating the separated signals. The condition computing means 15 includes reference line computing means for determining a triangulation reference line R from the output of the height of gravitational center/tilt computing means, means for computing a distance L to a feature point from the output of the reference line computing means and the output from feature point selecting means, and discriminating means for comparing the output of the distance computing means and a predetermined distance threshold value to determine whether the distance to the feature point is so small as to give a warning, and road sign discriminating means for comparing the colors of the adjacent portions of the feature point with given reference colors to make discriminations. The suspension 11 is controlled by the control means 17 in accordance with the output of the feature point distance computing means.

In the block diagram of FIG. 3, each of the blocks is itself of the known type. Also, a microcomputer may be used effectively to perform the functions of computation, discrimination, comparison, etc., shown in FIG. 3.

From the foregoing description it will be seen that in accordance with the first embodiment of the invention the visual sensor system for a moving object moving on a two-dimensional plane is designed so that the one-dimensional array of photosensitive means forming the sensor is mounted on the moving object such that the array is located within the plane substantially perpendicular to the central axis of the line of sight and has, within this plane, a tilt angle with respect to the vertical plane containing the central axis of the line of sight and thus there is the effect of realizing the visual sensor system capable of easily recognizing any object on the path, particularly such object as composed of substantially vertical lines or substantially horizontal lines and requiring no great time. In accordance with the second embodiment, the visual sensor system for a moving object movable along the two-dimensional plane includes means for detecting quantities which are computable in terms of the height of gravitational center and tilt angle about gravitational center of the moving object with respect to the two-dimensional plane, means for extracting a feature of the received information of the photosensitive means forming the visual sensor, and means for computing the distance to the feature point on the plane of movement in accordance with the information detected by the detecting means and the feature extracted by the feature extracting means and thus there is the effect of realizing the visual sensor system well suited for use as a road condition detecting system capable of detecting the conditions of a road surface without being affected by the conditions of the road surface and without being subjected greatly to the effect of any disturbance light.

We claim:

1. An image sensor system for a vehicle, comprising:
a one-dimensional array of photosensitive means mounted on said vehicle, said array of photosensitive means being arranged within an image plane and said array forming, within said image plane, a predetermined angle with respect to a line forming the intersection between said vehicle's plane of motion and said image plane, such that edge features of images projected onto said image plane which are parallel to said intersection line and which are spaced apart in a direction perpendicular to said intersection line will have their respective points of intersection with said array spaced apart in the direction of said array angle, and image edge features projected onto said image plane which are perpendicular to said intersection line and which are spaced apart in a direction parallel with said intersection line will have their respective points of intersection with said array spaced apart in the direction of said array angle; and
a processing means which, based on outputs from said photosensitive means, detects image edges within said image plane which are parallel or perpendicular to said intersection line.

2. A system according to claim 1, wherein said predetermined angle is about 30 to 60 degrees.

3. A visual sensor system for detecting surface conditions on a path forward of a vehicle movable along a two-dimensional plane of movement, said system comprising:
means for detecting quantities convertible to a height above said plane of movement of the gravitational center of said vehicle and a pitch angle between a second plane, said second plane being fixed with respect to said vehicle and substantially perpendicular to a normal direction of motion of said vehicle, and said plane of movement;
a one dimensional array of photosensitive sensor means mounted on said vehicle, for detecting diffuse light reflected from said forward path;
means for extracting a feature of received information from said photosensitive means;
means for computing said height of gravitational center and said pitch angle ( ) from information detected by said detecting means; and
means for computing a distance (L) from said photosensitive sensor means to a point on said two-dimensional plane based on said feature extracted by said feature extracting means, said height of gravitational center and said pitch angle; and
means to determine a surface condition of said two-dimensional plane based on said computed distance and extracted feature.

4. A system according to claim 3, wherein said feature extracting means determines whether both sides of said extracted feature point have a predetermined combination of colors as a basis of determining a class of said surface condition.

5. A visual sensor system comprising:
a moving object movable along a two-dimensional plane;
a one-dimensional array of photosensitive means fixedly mounted on said moving object in such a manner that said photosensitive means are located within a first plane substantially perpendicular to a central axis of a line of sight and form, within said first plane, a predetermined angle with a line intersecting a second plane containing the central axis of said line of sight and substantially perpendicular to said two-dimensional plane;
means for detecting quantities convertible to a height of gravitational center and tilt angle ($\alpha$) about gravitational center of said moving object;
means for extracting a feature of received information of said photosensitive means forming a visual sensor;
means for computing a height of gravitational center and tilt angle ($\alpha$) about gravitational center of said moving object from information detected by said detecting means;
means for computing a distance (L) to said feature point on said two-dimensional plane from said feature extracted by said extracting means, said height of gravitational center and said tilt angle ($\alpha$) about gravitational center to determine a surface condition; and
means responsive to an output from said means for detecting a distance (L) to said feature point to control a suspension of said moving object.

6. A system according to claim 5, wherein said predetermined angle is about 30 to 60 degrees.

* * * * *